United States Patent

Adam et al.

(10) Patent No.: US 6,778,823 B2
(45) Date of Patent: Aug. 17, 2004

(54) METHOD FOR TESTING THE QUALITY OF MOBILE RADIO NETWORKS

(75) Inventors: Rudiger Adam, Neunkirchen-Seelscheid (DE); Jens Niemeyer, Hennef (DE); Andreas Schindler, Bonn (DE)

(73) Assignee: T-Mobile Deutschland GmbH, Bonn (DE)

( * ) Notice: Subject to any disclaimer, the term of this patent is extended or adjusted under 35 U.S.C. 154(b) by 0 days.

(21) Appl. No.: 10/257,741

(22) PCT Filed: Feb. 20, 2002

(86) PCT No.: PCT/DE02/00593

§ 371 (c)(1),
(2), (4) Date: Apr. 21, 2003

(87) PCT Pub. No.: WO02/067615

PCT Pub. Date: Aug. 29, 2002

(65) Prior Publication Data

US 2003/0157931 A1 Aug. 21, 2003

(30) Foreign Application Priority Data

Feb. 20, 2001 (DE) .......................................... 101 08 158

(51) Int. Cl.$^7$ ................................................. H04Q 7/34
(52) U.S. Cl. .................... 455/423; 455/424; 455/67.11; 455/67.14; 370/244; 379/29.01
(58) Field of Search ................................. 455/423, 424, 455/67.11, 67.13, 67.14; 379/1.01, 9, 15.01, 29.01, 32.01; 370/241, 244, 245, 249, 250

(56) References Cited

U.S. PATENT DOCUMENTS 5,023,900 A * 6/1991 Tayloe et al. ............. 379/32.01
5,095,500 A * 3/1992 Tayloe et al. ............. 379/32.01
5,425,076 A * 6/1995 Knippelmier ............. 379/27.04
5,706,333 A * 1/1998 Grenning et al. ........... 455/423
5,711,000 A * 1/1998 Ploeg et al. ................. 455/423
5,920,607 A * 7/1999 Berg ......................... 379/1.01
5,940,471 A * 8/1999 Homayoun ............... 379/10.03
5,970,121 A * 10/1999 Homayoun .................. 379/28
6,052,584 A * 4/2000 Harvey et al. .............. 455/423
6,169,896 B1 * 1/2001 Sant et al. .................. 455/424
6,201,960 B1 * 3/2001 Minde et al. ................ 455/424
6,230,006 B1 * 5/2001 Keenan et al. .............. 455/424
6,424,837 B1 * 7/2002 Hall et al. ................ 455/456.5
6,542,738 B2 * 4/2003 Keenan et al. .............. 455/424
6,714,779 B2 * 3/2004 Hall et al. ................... 455/423

FOREIGN PATENT DOCUMENTS

DE          198 20 845      11/1999
EP          0 567 439       10/1993
WO          WO 00/38464      6/2000

* cited by examiner

*Primary Examiner*—Binh Tieu
(74) *Attorney, Agent, or Firm*—The Maxham Firm

(57) ABSTRACT

The invention relates to a method of testing the quality of mobile wireless networks which rules out subjective influences as much as possible in the evaluation of quality.

According to this invention, a number of test subscribers are equipped with mobile wireless terminals, each being assigned a special telephone number, whereby each test subscriber can communicate over a mobile wireless network selected individually from a quantity of several mobile wireless networks. The selected mobile wireless network is kept anonymous with respect to the test subscriber and is changed at certain intervals. Acquisition of the network quality perceived by the subscribers is performed promptly.

10 Claims, 2 Drawing Sheets

METHOD FOR TESTING THE QUALITY OF MOBILE RADIO NETWORKS

BACKGROUND

1. Field of the Invention

This invention relates generally to a method of testing the network quality in mobile wireless networks.

2. Discussion of the Related Art

According to the known state of the art, essentially two types of network quality tests are performed by each operator of a mobile wireless network. In one, purely technical measurements are made with automatic, stationary, or mobile systems or test mobile stations, an example being QVoice from Ascom. In the other, subscriber tracking/inquiries by the network operator are made at periodic intervals regarding the network quality as perceived by the subscriber.

In subscriber inquiries regarding the network quality, however, there is the problem that the perception of the customer or subscriber is usually influenced by subjective factors such as the image of the network operator, advertising, and peer pressure, among others, and thus, the network operator does not receive an objective evaluation of the actual network quality, but instead receives a more or less false evaluation.

SUMMARY OF THE INVENTION

A primary purpose of this invention is to provide a method of testing the quality of mobile wireless networks which rules out subjective influences as much as possible in the evaluation of quality.

This invention is characterized in that a number of test subscribers are equipped with mobile wireless terminals, each of which is assigned a special telephone number, and each test subscriber can communicate over a mobile wireless network selected individually from a quantity of multiple mobile wireless networks. The selected mobile wireless network is kept anonymous with respect to the test subscriber and is changed at certain intervals, and a prompt determination of the network quality perceived by the subscribers is implemented.

The advantage of this invention is that due to the anonymization of the mobile wireless networks, it is possible to capture the direct customer perception of the network quality, excluding subjective influences, such as image, advertising, and peer pressure, among others. In addition, the method according to this invention combines the advantages of the traditional methods of quality testing, that is, objective measured data acquisition and feedback from the subscriber's standpoint, and at the same time it eliminates most of their disadvantages, such as the feedback of a conversation quality evaluated "by machine" and the effect on the customer feedback by the image of the network operator and advertising.

The method according to this invention for testing mobile wireless networks is characterized by:

anonymized networks;

regular changing of networks; and prompt acquisition of impressions as to network quality through regular interviews.

Anonymization of the mobile wireless networks can be accomplished according to this invention by selectively:

blocking certain telephone number ranges to suppress operator-specific announcements (conversely: allowing only preselection ranges 02xx through 09xx);

blocking operator-specific quick-dial numbers;

suppressing terminal-specific technical features which cancel the blocking;

blocking display with the automated information from the network operator and service providers;

suppressing the automatic/manual network dialing (conversely: preset network selection);

blocking features such as SMS (MO, MT, CB) with which one's own telephone number can be read out or displayed; or changing the calling card profiles with the following services: only domestic telephone; no international roaming coming or going; no mailbox; no fax/data service; no SMS; permanent identification suppression CLIR (calling line identification restriction); no call forwarding; blocking 1-800/1-900 numbers.

In a preferred embodiment of this invention, the reachability of the respective test subscriber via a virtual telephone number assigned to him personally is ensured during the entire testing period. There is call forwarding of these virtual telephone numbers to operator-specific calling card/telephone numbers (SIM card numbers), that is, to a certain mobile wireless network. When changing the mobile wireless network, there is a cyclic exchange of operator-specific calling cards/telephone numbers with appropriate adaptation of the call forwarding. Another possibility is to perform the exchange of the identical and possibly sealed mobile wireless terminals including the respective calling cards, for example, during regular equipment maintenance, and thus in a manner that is not trackable for the test subscriber.

A central neutral interview office (agency) is preferably established so that a daily, weekly, or monthly polling and hotline consultation of test subscribers can be performed. The acquisition, processing, and analysis of the results likewise take place through this agency or another one.

In the tracking of the test subscribers, supplementary questionnaires are used, such as a daily, weekly, and monthly questionnaire (after changing networks) and a concluding questionnaire at the end of the test.

BRIEF DESCRIPTION OF THE DRAWING

The objects, advantages and features of the invention will be more clearly perceived from the following detailed description, when read in conjunction with the accompanying drawing, in which.

DETAILED DESCRIPTION OF THE PREFERRED EMBODIMENTS

Figure 1:
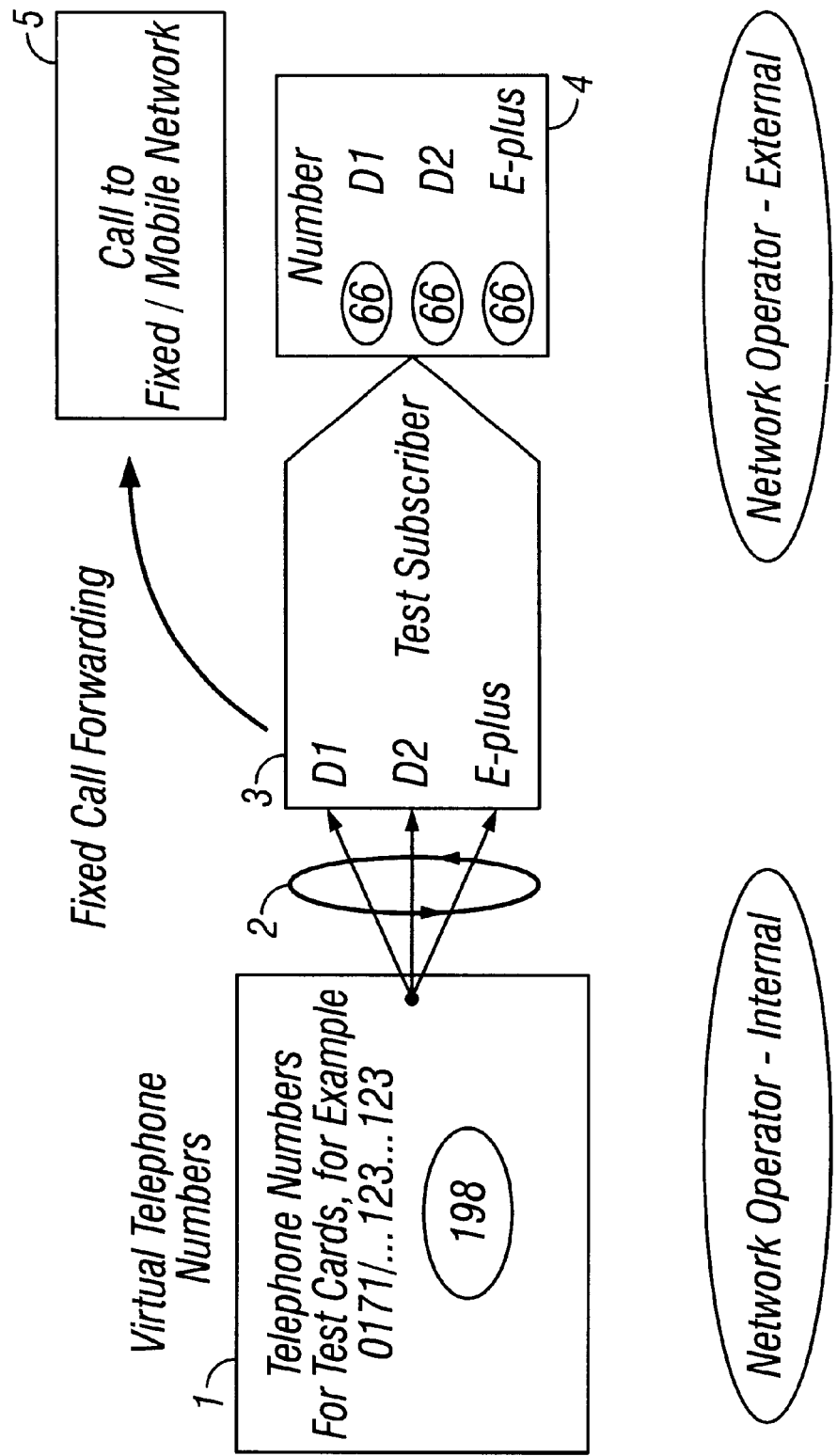
FIG. 1 is a block diagram showing activation of test subscribers in the various networks.

According to FIG. 1, the network operator provides a certain number (198 here) of virtual mobile wireless telephone numbers 1, each of which is assigned to a corresponding number of test subscribers. The test subscribers can be reached at their particular virtual telephone numbers during the test subscriber relationship. These telephone numbers are selected so that no information is provided regarding the mobile wireless network used, for example, D1, D2, and E-plus in Germany. Telephone numbers of the test subscribers are assigned in equal numbers to one of the mobile wireless networks D1, D2, and E-plus, that is, the respective test subscriber communicates exclusively over the mobile wireless network assigned to him at that moment.

For this purpose it is necessary to set up call forwarding 2, which images the virtual telephone number assigned to the subscriber on a telephone number which actually exists in the respective mobile wireless network 3. By changing the call forwarding 2, the mobile wireless network assigned to a subscriber is changed at certain intervals. For example, if a test period of three months is provided, a one-month period of using one of the mobile wireless networks D1, D2, and E-plus, respectively, is enabled for the test subscriber.

Thus, 66 subscribers are always enabled in one of the mobile wireless networks at a time, so the networks are exchanged cyclically, as shown in box 4.

The subscribers can, of course, be reached at their virtual telephone numbers not only in the mobile wireless networks, but also from fixed networks 5.

The assignment of the virtual telephone numbers and the call forwarding are managed internally by the network operator, or by an authorized agent performing the test, or both.

Use of the mobile wireless networks and fixed networks provided for the test takes place externally from the network operator.

In order for the mobile wireless network currently being used by the subscribers to remain anonymous, all functions and services which could provide the subscriber with an indication of the mobile wireless network being used by the subscriber are blocked or turned off, or both, for the duration of the test. This is an important aspect of the invention because the subscribers should be prevented from allowing their subjective perceptions to influence the test appraisal.

To rule out any other subjective influences, the manufacturer of the mobile wireless terminals used in the test could also be made unidentifiable. Of course, all the test subscribers are equipped with the same mobile wireless terminal.

Figure 2:
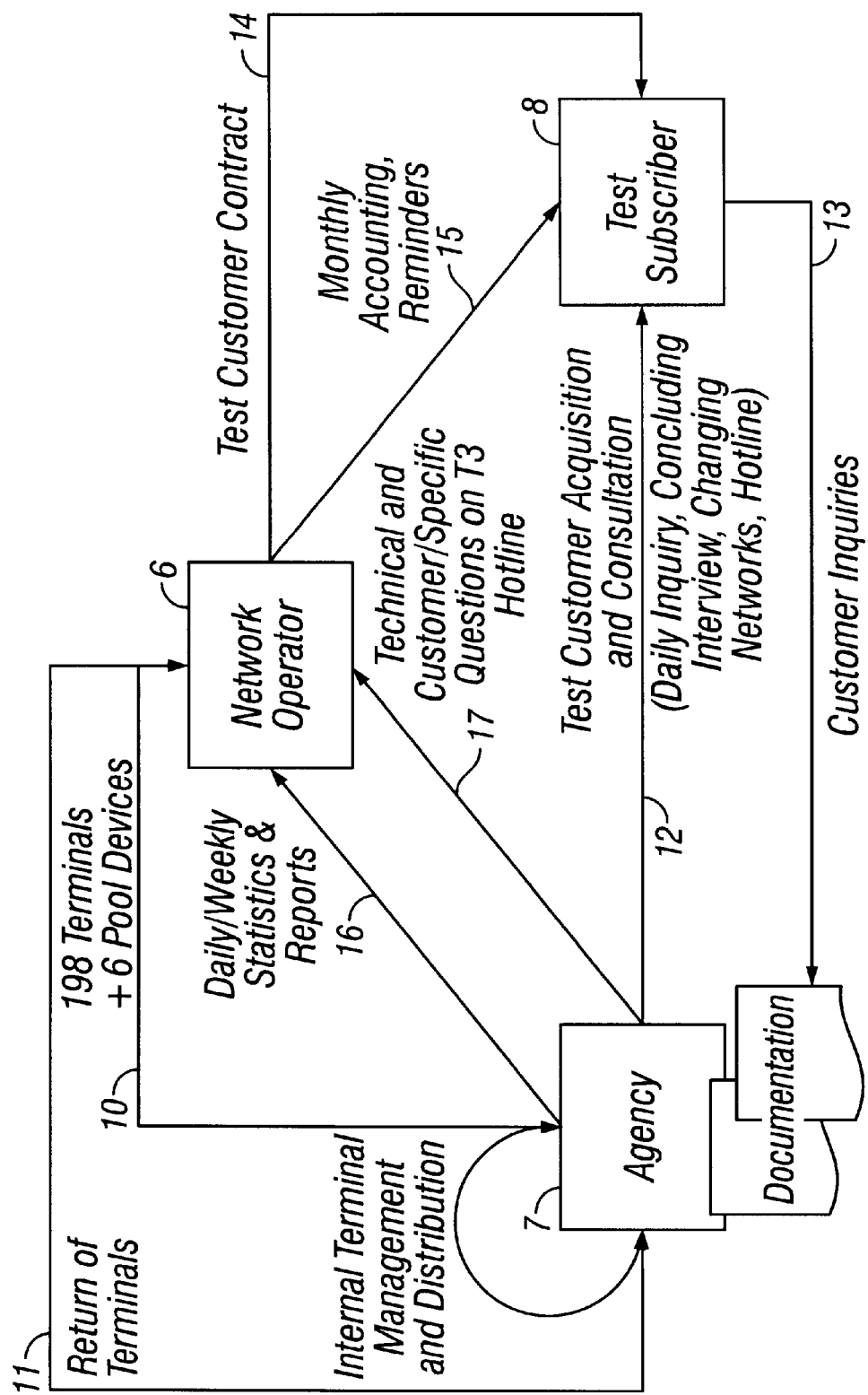
FIG. 2 is a diagram showing an overview of the linkage of the instances participating in the test and their interaction.

FIG. 2 shows an overview of the linkage of the instances involved in the test and their interaction.

Mobile wireless network operator 6 makes available to agency 7 performing the test a number of mobile wireless terminals 10. Agency 7 manages these terminals and makes them available to test subscribers 8. After the end of the test, the terminals are returned to the network operator and are available for subsequent tests 11.

The test subscribers 8 conclude a test customer contract 14 with network operator 6 and in doing so they receive a calling card for operation of the terminal. This calling card contains their personal virtual telephone number at which they can be reached during the test.

Monthly accounting 15 is handled as usual through network operator 6.

The acquisition of test subscribers and consulting with them are the responsibility of the commissioned agency 12. Customer inquiries are also managed by the agency over a special hotline 13.

Furthermore, agency 7 performs regular inquiries of the test subscribers regarding the network quality. This is done in writing or orally and is preferably done daily and at the conclusion of the test series 12. Agency 7 also performs and controls the changes in the mobile wireless network used by subscribers 8 during the test.

Agency 7 supplies statistics and reports on the course and the result of the test 16 to network operator 6 daily or weekly during the period of the test.

On the other hand, network operator 6 advises agency 7 with regard to technical and subscribers-specific questions 17.

What is claimed is:

1. A method for testing the quality of mobile wireless networks, the method comprising:
   equipping a number of test subscribers with mobile wireless terminals, each being assigned a special telephone number, whereby each test subscriber can communicate over a mobile wireless network selected individually from a quantity of several mobile wireless networks;
   keeping the selected mobile wireless network anonymous with respect to the test subscriber;
   changing the selected mobile wireless network at certain intervals; and
   implementing a prompt acquisition of the network quality perceived by the subscribers.

2. The method according to claim 1, wherein the mobile wireless networks are changed in a rotating manner.

3. The method according to claim 1, wherein the mobile wireless networks are anonymized by selectively:
   blocking certain telephone number ranges to suppress operator-specific announcements;
   blocking operator-specific quick-dial numbers;
   suppressing terminal-specific technical features which cancel the blocking;
   blocking display with automated information from the network operators and service providers;
   suppressing automatic/manual network dialing or preset network selection;
   blocking features such as SMS (MO, MT, CB) with which one's own telephone number can be read out or displayed; or
   changing the calling card profiles with the following services, as selected: only domestic telephony; no international roaming coming or going; no mailbox; no fax/data service; no SMS; permanent suppression of identification; no call forwarding; blocking 1-800/1-900 numbers.

4. The method according to claim 2, wherein the mobile wireless networks are anonymized by selectively:
   blocking certain telephone number ranges to suppress operator-specific announcements;
   blocking operator-specific quick-dial numbers;
   suppressing terminal-specific technical features which cancel the blocking;
   blocking display with automated information from the network operators and service providers;
   suppressing automatic/manual network dialing or preset network selection;
   blocking features such as SMS (MO, MT, CB) with which one's own telephone number can be read out or displayed; or
   changing the calling card profiles with the following services, as selected: only domestic telephony; no international roaming coming or going; no mailbox; no fax/data service; no SMS; permanent suppression of identification; no call forwarding; blocking 1-800/1-900 numbers.

5. The method according to claim 1, 2, 3, or 4, wherein the mobile wireless terminals are identical and sealed.

6. The method according to claim 1, 2, 3, or 4, wherein the special telephone number is a virtual telephone number assigned individually to the test subscriber.

7. The method according to claim 1, 2, 3, or 4, wherein the virtual telephone number is assigned to an operator-specific telephone number of the selected mobile wireless network by way of a call forwarding function.

8. The method according to claim 1, 2, 3, or 4, wherein the network quality is determined by tracking of the test subscribers on a daily, weekly, or monthly basis, or at any desired point in time.

9. The method according to claim 1, 2, 3, or 4, wherein the tracking of the test subscribers is performed by a neutral central office.

10. The method according to claim 1, 2, 3, or 4, wherein acquisition, processing and analysis of the results of the tracking are performed in the central office.

* * * * *